United States Patent

Calimeri

[11] Patent Number: 5,163,014
[45] Date of Patent: Nov. 10, 1992

[54] PITCHING SPEED INDICATOR

[76] Inventor: Joseph J. Calimeri, 133 Main St., Coopers Plains, N.Y. 14827

[21] Appl. No.: 553,774

[22] Filed: Jul. 13, 1990

[51] Int. Cl.$^5$ .................. G06F 15/44; G04F 10/00
[52] U.S. Cl. ....................... 364/565; 273/25; 273/26 R; 364/516; 364/569; 368/2; 368/110
[58] Field of Search .............. 434/247; 364/565, 569, 364/413.01, 705.01, 705.07, 516, 410; 368/1, 2, 101, 102, 107, 109; 273/25, 26 R, 26 A; 250/222.1

[56] References Cited

U.S. PATENT DOCUMENTS

| | | | |
|---|---|---|---|
| 1,059,985 | 4/1913 | Finster et al. | 368/101 |
| 2,978,863 | 4/1961 | Strobel | 368/2 |
| 3,229,975 | 8/1962 | Tompkins et al. | 273/26 A X |
| 3,557,547 | 1/1971 | Rejminger | 368/101 |
| 3,727,069 | 4/1973 | Crittenden, Jr. | 250/222.1 |
| 4,128,761 | 12/1978 | Oehler | 250/222.1 |
| 4,199,141 | 4/1980 | Garcia | 273/264 A X |
| 4,211,066 | 7/1980 | Kusumoto et al. | 368/101 |
| 4,219,878 | 8/1980 | Goodson et al. | 364/565 |
| 4,352,064 | 9/1982 | Dunn | 364/565 |
| 4,367,051 | 1/1983 | Inoue | 368/2 |
| 4,486,847 | 12/1984 | Wattenhofer | 364/705.07 |
| 4,545,576 | 10/1985 | Harris | 364/516 |
| 4,563,005 | 1/1986 | Hand et al. | 273/26 R |
| 4,659,090 | 4/1987 | Kustanovich | 273/26 A X |
| 4,770,527 | 9/1988 | Park | 273/26 A X |
| 4,775,948 | 10/1988 | Dial et al. | 364/565 |
| 4,837,718 | 6/1989 | Alon | 364/565 |
| 4,845,690 | 7/1989 | Oehler | 364/565 |
| 4,959,807 | 9/1990 | Thompson et al. | 364/565 |

OTHER PUBLICATIONS

Owner's Manual-3-Channel Alarm Timer.
Thomas Register Catalog File-2543.
Thomas Register Catalog File-2548.
Thomas Register Catalog File-2814.
Thomas Register Catalog File-5768.

Primary Examiner—Kevin J. Teska
Attorney, Agent, or Firm—Ralph R. Barnard

[57] ABSTRACT

An apparatus which can determine the velocity of a projectile based on distance traveled and time of travel. The apparatus includes a manually operated stopwatch function which can measure elapsed time to at least hundredths of a second, a calculator function which can convert elapsed time and distance traveled by the projectile into velocity of the projectile, and a display to show the velocity. The apparatus can have either a digital or an analog stopwatch function.

9 Claims, 3 Drawing Sheets

PITCHING SPEED INDICATOR

BACKGROUND OF THE INVENTION

1. Field of the Invention

This invention relates to measurement of velocity of a projectile such as a baseball.

2. Description of the Related Art

There are a number of devices for measuring the velocity of a projectile as it travels between two points. For example, U.S. Pat. No. 4,770,527, issued on Sep. 13, 1988 to K. T. Park, and U.S. Pat. No. 4,128,761, issued on Dec. 5, 1978 to K. L. Oehler, both discuss measurement of the velocity of a projectile as it travels between two points.

Although both the Parks and the Oehler devices measure velocity very accurately, neither device can be used to measure the velocity of a baseball as it is pitched during a game. Further, both devices are expensive to manufacture and require bulky apparatus.

In professional baseball, the velocity of pitched balls is measured during games by training a radar gun at the ball after it has been released by the pitcher. While this provides an accurate measurement of the ball's velocity, it also requires relatively bulky apparatus, when calibration devices are considered, and it too is expensive. Furthermore, the radar gun must be calibrated each day (sometimes more than once in a day) in order to function accurately.

In amateur baseball and softball, the velocity of pitched balls is often calculated by hand, using a stopwatch to time the ball's flight and measuring the distance traveled. This approach is slow and tedious, as well as being less accurate than the devices described above. Great accuracy, however, is not required in amateur baseball and softball, as it is in professional baseball.

There is therefore a need for a device which will measure the velocity of a pitched ball without the use of bulky equipment and without the need for laborious hand calculations. There is also a need for such a device which is inexpensive to manufacture.

SUMMARY OF THE INVENTION

The present invention includes an apparatus for determining velocity of a projectile, with means for measuring elapsed time to at least hundredths of a second, means for initiating and stopping the timing means and input means for providing distance traveled by the projectile. Operably connected to the timer and input means is a means for converting the measurement of elapsed time and the distance traveled to velocity. There is also means for displaying the calculated velocity.

Accuracy of the apparatus will be a function of the operator's reflexes, the accuracy of the timing means within the apparatus and the accuracy of the measurement of distance traveled by the projectile.

It is therefore the primary objective of the invention to provide a device for measuring and displaying the velocity of a projectile.

It is a further objective of the invention to provide an easy to use and inexpensive device for measuring the velocity of a projectile.

It is yet a further objective of the invention to provide a device that can be used for measuring the velocity of a baseball or softball that has been pitched during a game.

Further objects, features and advantages may be found in the following drawing, specification and claims.

DETAILED DESCRIPTION OF THE INVENTION

In amateur baseball, there are two regulation sized baseball diamonds, one for children 12 years old or younger and one for those over 12 years old (which is also the size used in professional baseball). The larger diamond calls for a regulation pitching distance (distance between home plate and the pitching rubber) of sixty feet, six inches. The smaller baseball diamond calls for a regulation pitching distance of forty-six feet.

The actual pitching distance, however, is measured from the point at which the pitcher releases the ball to the point where the ball lands in the catcher's mitt. Therefore, although the regulation pitching distances are constant, the actual pitching distance varies slightly, depending on the height and arm length of the pitcher and how far back from home plate the catcher stands.

Figure 1:
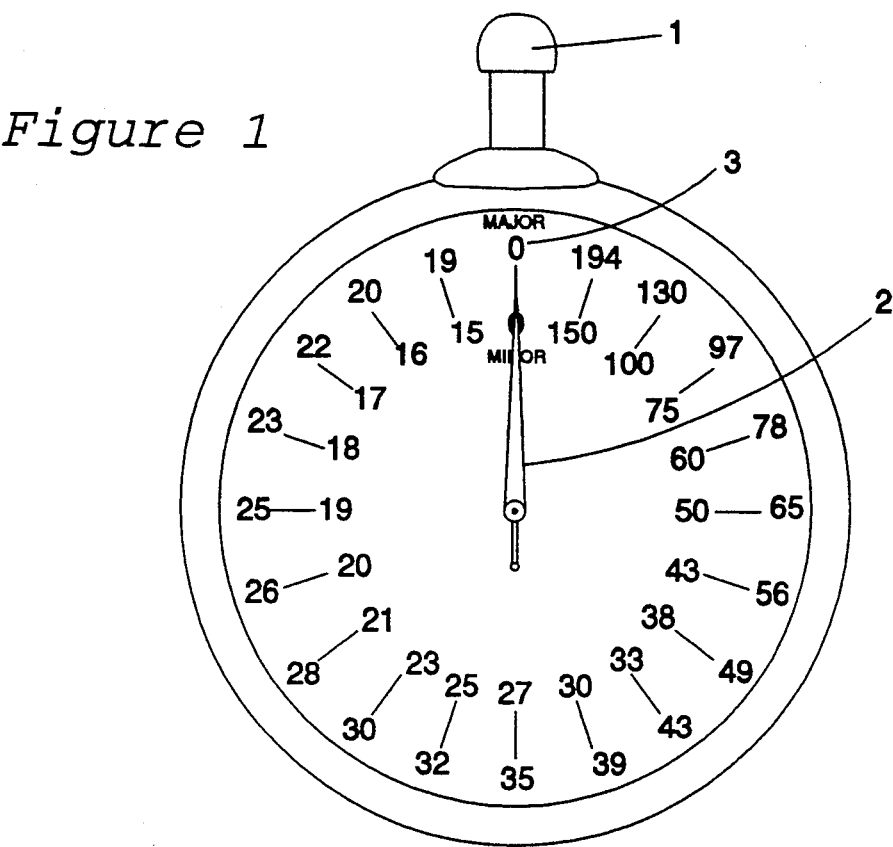
FIG. 1 illustrates an analog embodiment of the apparatus of the invention where the velocity is indicated on a scale present on the face of the apparatus.

Referring now to FIG. 1 in detail, an analog embodiment of the invention is illustrated, the basic form being that of a stopwatch. The face of this embodiment has a scale for velocity based on a pre-set distance traveled so that when the second hand 2 stops, it will automatically point to the velocity.

The apparatus is very easy to operate. The operator simply starts the stopwatch function by pressing the start button 1 when the pitcher releases the ball, stops the stopwatch function by pressing the stop button 1 when the catcher catches the ball, then looks at the second hand 2 on the face of the apparatus. The second hand pointer will indicate the velocity of that pitch.

Although use of a pre-set distance results in a less accurate measurement of velocity, it does allow for ease of operation. Further, there are inherent limitations in the accuracy of the manually operated timing means of this apparatus, due to the relative slowness of human response (as compared to a machine). However, the time it takes to start the device and the time it takes to stop the device will tend to be the same and these errors will therefore cancel each other out. Moreover, as an operator becomes more familiar with the device, the operator's response time will tend to become standardized, and he will obtain consistent readings based on his reaction time. Thus, the accuracy lost by use of a pre-set distance is minimal and is offset by the operator's ability to obtain velocity measurement without laborious hand calculations or the use of expensive equipment.

The following Table I is a chart of the velocity of a projectile, calculated according to Equation 1:

$$\frac{(K \text{ ft})}{(5280 \text{ ft/mi})} \cdot \frac{(3600 \text{ sec/hr})}{(y \text{ sec})} = X \text{ mph,}$$

where k is a constant distance and y is a time variable. In Table I, the velocity of a projectile has been calculated for two different distances; A where k=57 and B where k=43. These are approximations of the actual pitching distance under the two regulations, 57 feet for the major league regulation distance of 60.5 feet and 43 feet for the little league regulation distance of 46 feet. If a different measure were used for actual pitching distance, for example from the pitcher's hand to home plate, rather than to the catcher's mitt, different approximations would be used.

TABLE I

| TIME | DISTANCE TRAVELED (mph) | |
|---|---|---|
| (sec.) | A (57 ft) | B (43 ft) |
| 0.10 | 389 | 293.2 |
| 0.20 | 194 | 146.6 |
| 0.30 | 130 | 97.7 |
| 0.40 | 97.2 | 73.3 |
| 0.50 | 77.7 | 58.6 |
| 0.60 | 64.8 | 48.9 |
| 0.70 | 55.5 | 41.9 |
| 0.80 | 48.6 | 36.6 |
| 0.90 | 43.2 | 32.6 |
| 1.00 | 38.8 | 29.3 |
| 1.10 | 35.3 | 26.7 |
| 1.20 | 32.4 | 24.4 |
| 1.30 | 29.9 | 22.6 |
| 1.40 | 27.8 | 20.9 |
| 1.50 | 25.9 | 19.5 |
| 1.60 | 24.6 | 18.3 |
| 1.70 | 22.9 | 17.2 |
| 1.80 | 21.6 | 16.3 |
| 1.90 | 20.4 | 15.4 |
| 2.00 | 19.4 | 14.7 |

In FIG. 1, the start, stop and reset functions are located on the same button 1. Pressing the button once starts the second hand 2, pressing the button a second time stops the second hand and pressing the button a third time resets the second hand to the beginning (zero) position 3. The device could also be configured such that there is an automatic reset when the start function is initiated. It is, however, to be understood that these are not limitations on the invention—the start, stop and reset functions may be on a plurality of separate buttons, in any combination thereof.

Figure 2:
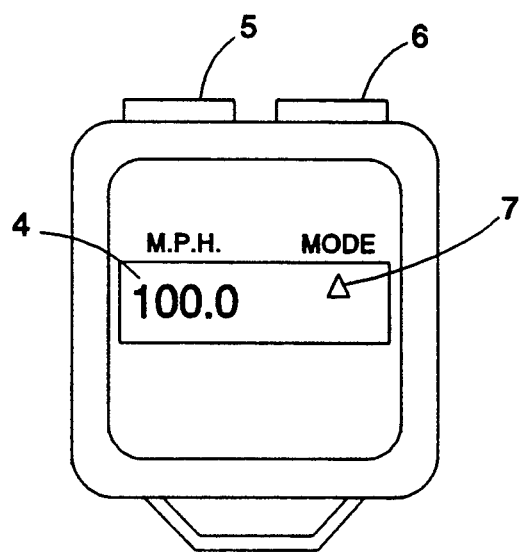
FIG. 2 illustrates a digital embodiment of the apparatus of the invention where the velocity is indicated on a display on the face of the apparatus.

Referring now to FIG. 2 in detail, a digital embodiment of the invention is illustrated, the basic form here also being that of a stopwatch (in this case, a digital stopwatch). The stopwatch will have at least a display 4, a start-stop button or buttons 5, and a means for switching the velocity calculating function between a distance for the larger baseball diamond and a distance for the smaller baseball diamond. In this embodiment, the means for switching mode entails turning the power on to the device with the start/stop button 5 depressed for one mode or not depressed for the other mode. FIG. 2 also shows an on/off button 6 and a mode indicator 7. Table I (above), which charts the velocity of a projectile calculated according to Equation 1 (above), is also applicable to the digital embodiment of the apparatus of the invention.

The operation of this digital apparatus is also simple. Before timing a pitch, the operator must select the mode in which to operate. The choice of mode is dependent only on the size of the baseball diamond (and therefore pitching distance)—whether a "Major League" or a "Little League" diamond. The operator then turns the device on by depressing the on/off switch 6 with the start/stop switch 5 depressed or not, depending on the mode desired. He then starts the stopwatch function by pressing the start/stop button 5 when the pitcher releases the ball and stops the stopwatch function by pressing the start/stop button 5 when the catcher catches the ball. The velocity of the pitched ball is then shown on the display 4.

Figure 3:
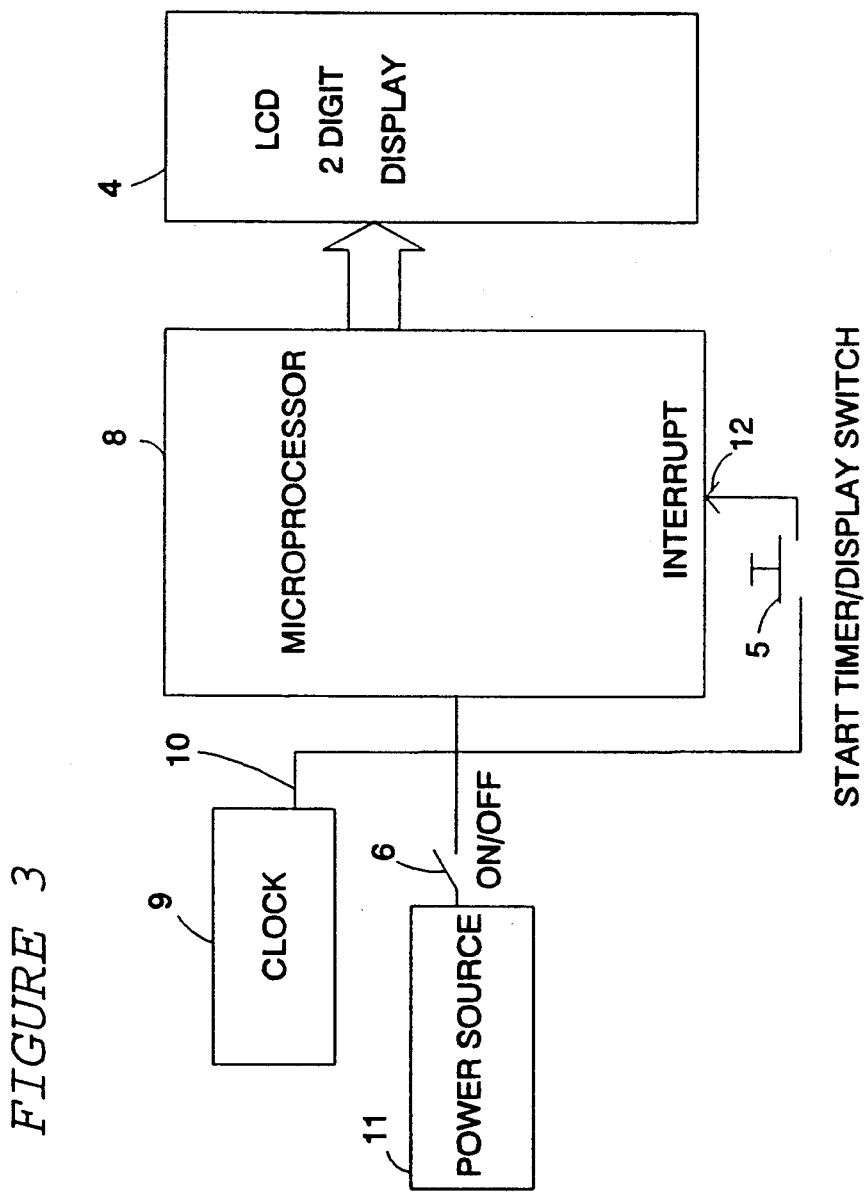
FIG. 3 is a block diagram of the digital embodiment of the apparatus of the invention.

FIG. 3 is a block diagram of the operation of the digital embodiment of the device. When the power switch 6 is closed, power flows from the power source 11 to the microprocessor 8, the clock apparatus 9, and one pole of the start-stop switch 5 (which is open). This places the microprocessor into a ready state, waiting for an interrupt signal, and begins the sending of timing signals 10 from the clock to the microprocessor. When the start/stop button 5 is pressed, power flows across the switch and to the interrupt line 12 on the microprocessor, and the microprocessor begins to time the interval. When the start/stop button is again pressed, the microprocessor responds to the interrupt signal by finishing the timing operation. The information received by the microprocessor from the clock during the timed interval is used to calculate the elapsed time between interrupt signals. The conversion of elapsed time to velocity is then performed by the microprocessor 8, and the resulting velocity is output to the LCD display 4.

Figure 4:
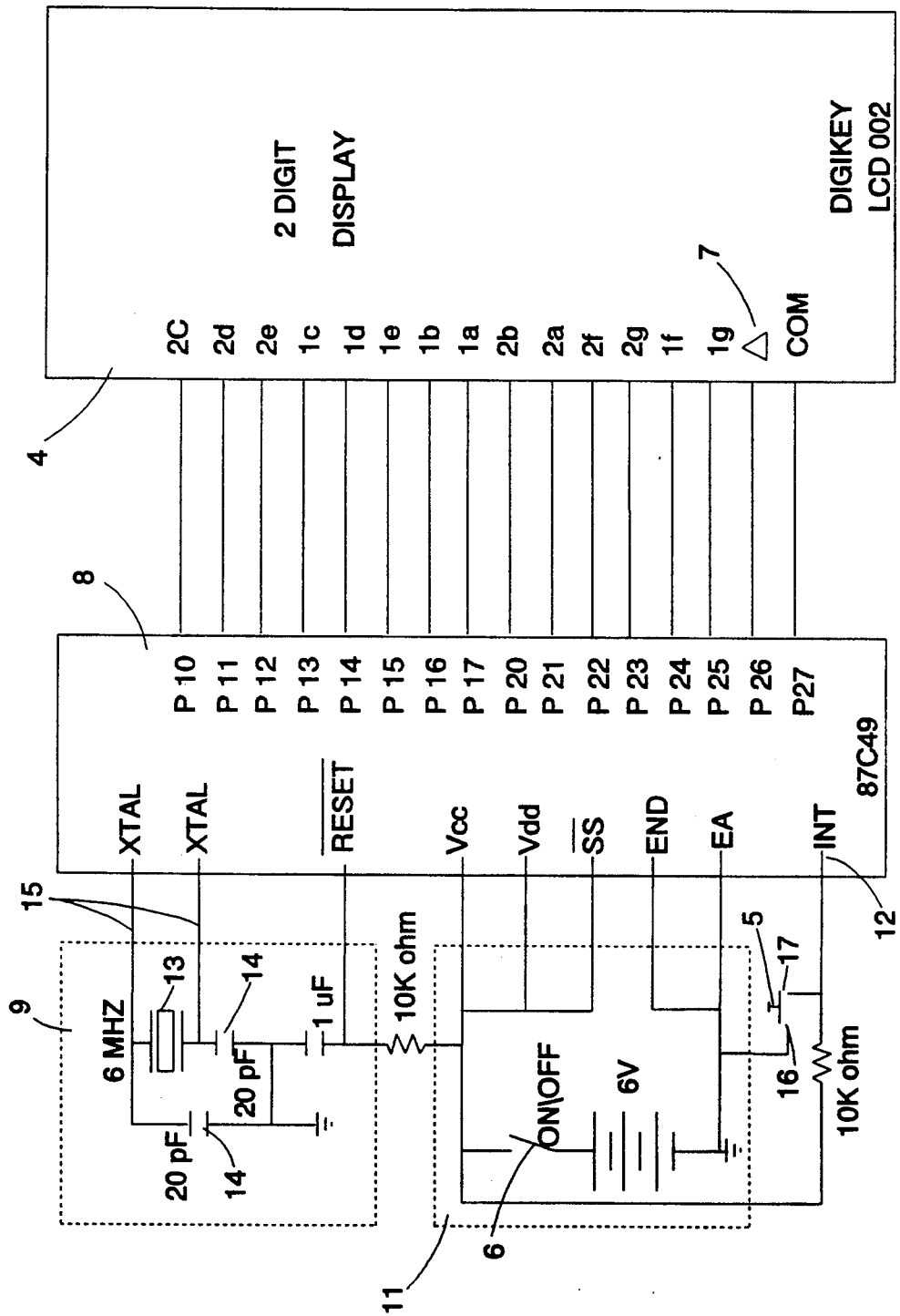
FIG. 4 is a schematic diagram of the digital embodiment of the apparatus of the invention.

FIG. 4 is a detailed schematic of one configuration of the digital embodiment of the invention. The microprocessor used in this specific embodiment is an Intel 87C49, but any of a large number of microprocessor chips could be used. The clock apparatus 9 is a circuit comprising a 6 MHz quartz crystal 13 and several capacitors 14, which is connected to microprocessor inputs 15 that are designed for connection of such an apparatus. The power on/off switch 6, when closed, supplies power to the microprocessor 8, the clock circuit 9, and one pole 16 of the start/stop switch 5. The other pole 17 of the start/stop switch is tied to the interrupt line 12 of the microprocessor, such that when the momentary switch is closed and opened an interrupt signal will flow to that input of the microprocessor.

The microprocessor has memory that holds a program which enables it to process the interrupt signals and clock signals, determine elapsed time, convert that time to velocity, and then create and output the proper signals for the LCD display. The program, when the power is switched on and the microprocessor is reset, senses the interrupt line to determine whether the start/stop switch is open or closed. If the line is high (switch closed), the program will operate in "large diamond" mode; if it is low (switch open), the program will operate in "small diamond" mode. The mode indicator 7 on the display will be lit when in "large" mode and not lit when in "small" mode. This minimizes the number of switches, allowing the user to select a mode by cycling power with the switch up or down depending on his choice. Alternatively, there could be a separate button for mode selection, with indication of the active mode an inherent part of the switch or on the display.

In another alternative embodiment, the digital apparatus could be made to allow an operator to change the distance setting (mode) after (as well as before) timing a pitch, in case the mode used was incorrect.

While the foregoing example of use of the invention has been drawn to measuring the speed of a pitched baseball or softball, it will be apparent to those skilled in the art that the disclosed device and method could be used to measure the velocity of any projectile moving over a known distance. For example, the device could be used to measure the velocity of cars on a road or track, or that of downhill skiers on a slope.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

What is claimed is:

1. An apparatus for determining velocity of a projectile, comprising:
   a) an input means for providing multiple settings of distance traveled by the projectile,
   b) a digital timing means for measuring elapsed time to at least hundredths of a second, said timing means including means for manually initiating and stopping said timing means,
   c) a conversion means for determining velocity from said measurement of elapsed time and any one of said multiple settings of distance traveled, said conversion means connected to said input means and digital timing means,
   d) a means for displaying said determined velocity, said displaying means connected to said conversion means,
   e) a means to reset said timing and displaying means, said reset means connected to each of said timing means and displaying means, and
   d) a switching means for switching between settings of distance traveled, said switching means connected to said input means and conversion means.

2. The apparatus of claim 1, further comprising means for providing power to said apparatus.

3. The apparatus of claim 1, wherein said distance traveled by the projectile is a pre-set, standard distance.

4. The apparatus of claim 3, further comprising:
   a) a plurality of conversion means capable of determining velocity, wherein there is a one-to-one correspondence between conversion means and settings of distance traveled.

5. The apparatus of claim 4, further comprising an output means for indicting which of said multiple settings has been selected.

6. The apparatus of claim 3, further comprising an output means for indicating which of said multiple settings of distance traveled has been selected.

7. The apparatus of claim 6, wherein said projectile is a pitched baseball.

8. The apparatus of claim 7, wherein said multiple settings of distance traveled are 46 feet and 60 feet 6 inches.

9. An apparatus for determining a velocity of a projectile, comprising:
   a) an input means for providing multiple settings of distance traveled by the projectile, wherein, said multiple settings of distance traveled by the projectile are pre-determined, standard distances,
   b) a digital timing means for measuring elapsed time to at least hundredths of a second, said timing means including means for manually initiating and stopping said timing means,
   c) a means for switching between said multiple settings of distance traveled by the projectile, connected between said input means and said conversion means,
   c) a conversion means for determining velocity from said measurement of elapsed time and a pre-determined standard distance traveled, said conversion means connected to said input means and timing means,
   d) a means for displaying said determined velocity, said displaying means connected to said conversion means,
   e) a means to reset said timing means and displaying means, said reset means connected to each of said timing means and displaying means,
   f) an output means for indicating which of said multiple settings has been selected, connected to said displaying means and said means for switching between said multiple settings of distance traveled by the projectile, and
   g) a means for providing power to said input means, said digital timing means, said means for switching between said multiple settings of distance traveled by the projectile, said conversion means, said displaying means, and said output means.

* * * * *